July 7, 1925.

M. J. JOHNSON ET AL 1,544,646

SYNCHRONIZED SPEED REGULATED POWER TRANSMISSION APPARATUS

Filed Nov 1, 1922

Inventors
Manfred J. Johnson
Thomas E. White.
By their Attorney

Patented July 7, 1925.

1,544,646

UNITED STATES PATENT OFFICE.

MANFRED J. JOHNSON, OF NAUGATUCK, AND THOMAS E. WHITE, OF WATERBURY, CONNECTICUT, ASSIGNORS TO THE BRISTOL COMPANY, OF WATERBURY, CONNECTICUT, A CORPORATION OF CONNECTICUT.

SYNCHRONIZED SPEED-REGULATED POWER-TRANSMISSION APPARATUS.

Application filed November 1, 1922. Serial No. 598,426.

*To all whom it may concern:*

Be it known that we, MANFRED J. JOHNSON and THOMAS E. WHITE, citizens of the United States, and residents of Naugatuck and Waterbury, respectively, in the county of New Haven and State of Connecticut, have invented certain new and useful Improvements in Synchronized Speed-Regulated Power-Transmission Apparatus, of which the following is a specification.

The invention relates to a power transmission apparatus which is designed to operate at various speeds, the particular rotational velocity of the transmitted power being under the control of, and corresponding to and synchronized with the speed of, a secondary and minor power or control member. The apparatus set forth may be employed for various purposes; and, for example, is particularly suitable in connection with the operation of synchronized devices, such as a motion picture projector and sound reproducing apparatus operating synchronously therewith and wherein it is desired to provide ample power for operating one of the members, for example the projector, and yet allow of control of the rotational velocity thereof from and in accordance with the velocity of a member of much less power, such as the sound reproducing apparatus.

In acordance with the present invention, when the devices are not operating, there is no positive connection between the power member and the operating driven shaft or apparatus to be power-operated, the connection between the source of power and the operating driven shaft being dependent upon movement of the control member and the rotational velocity entirely upon the rotational velocity of said control member and is initiated thereby. The rotational velocity of said operating shaft will be directly proportional, also, to the said rotational velocity of the control member and will conform thereto so that the several members may be arranged to be maintained in synchronous operation and one at least provided with considerable power.

To this end, a friction disk drive is employed to effect the transmission of power to the member requiring the greater power and the movement of one of the disks over the other is under the control of the said control member operating at lesser power. Moreover, the arrangement of the mechanism is such that, when the apparatus is in operation, an axial thrust results which automatically exerts a positive pressure between the disks sufficient to insure the transmission of the power therethru, the pressure being in proportion to the power transmitted. Means, also, are provided for adjusting the initial friction between the disks, and to provide for wear, as by affording manual means for axially adjusting the shaft on which one of said disks is mounted.

The nature of the invention, however, will best be understood when described in connection with the accompanying drawings, in which—

Similar characters of reference designate corresponding parts thruout the several views.

Figure 1:
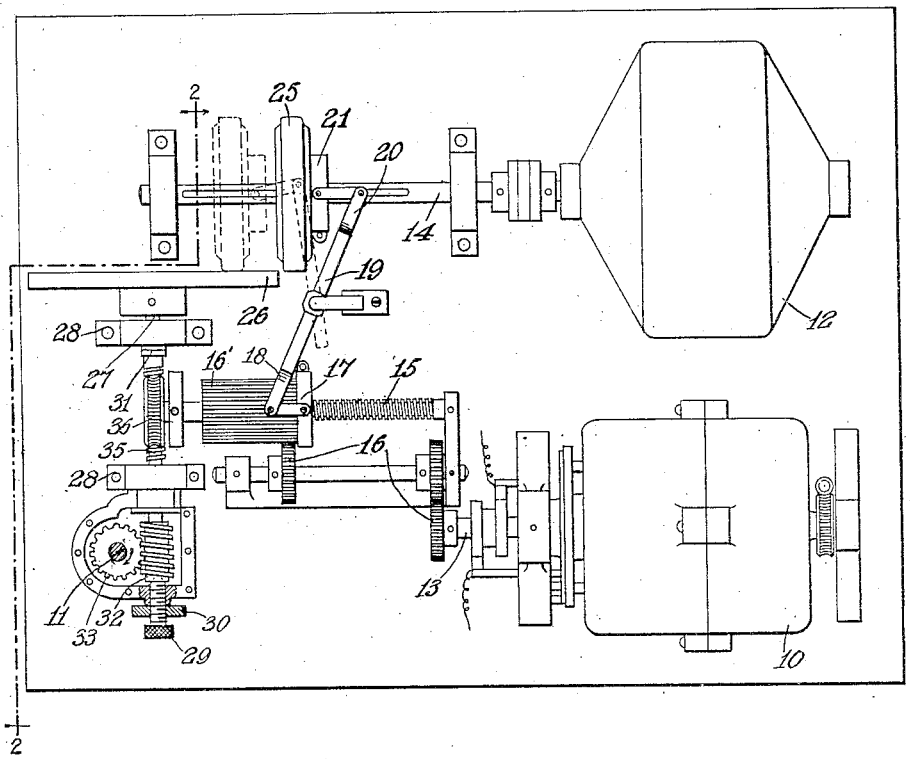
Fig. 1 is a plan of the transmission apparatus.
Figure 2:
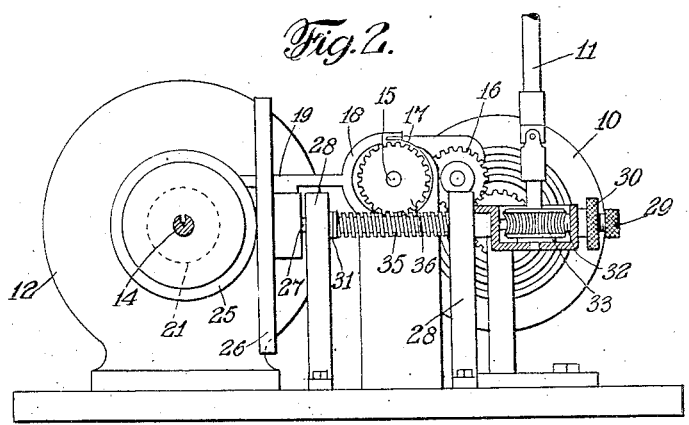
Fig. 2 is a vertical section, taken on the line 2—2, Fig. 1, and looking in the direction of the arrows.

Referring to the drawings, 10 designates a control motor, such as a synchronized motor employed in connection with the synchronous operation of a motion picture projector and talking machine (not shown), said control motor being operated from and under the regulation of the latter, all of which is more fully set forth in U. S. Letters Patent Nos. 1,234,127 and 1,396,401.

As set forth in said patents, the projecting machine (not shown) is to be driven from a driving shaft as the shaft 11 and to which suitable power is to be transmitted. In accordance with the present invention, this is effected, by the particular intermediate mechanism forming the subject matter of the present invention, from a driving motor 12. Control motor 10 is caused to rotate a shaft 13, and the driving motor 12 a shaft 14 arranged parallel to the shaft 13 and normally disconnected from the shaft 11. A compensating and threaded shaft 15 is arranged between the two shafts 13 and 14 and parallel therewith, and the said threaded shaft is connected with the control shaft thru suitable gearing 16 including a nut member 16' fitting over the threads of the compensating shaft 15. Mounted over one end of the nut member is a ring 17 which is pivotally held at the top and bottom to a yoke 18 embracing the compensating shaft and at one end of a lever 19. The other end of the lever 19 is provided with a similar yoke 20 embracing the shaft 14 and pivotally mounted to the top and bottom of a ring member 21 loosely mounted on the power shaft 14.

There is further mounted on the power shaft, and slidable longitudinally along same with ring 21, one member 25 of a friction disk drive, said member being reciprocable on said power shaft thru the action of the ring 21.

Arranged at right angles to the power shaft 14 is the cooperating friction disk 26, designed to be engaged by the driving member 25 (as indicated in the position shown in dotted lines); and the same is mounted on a driven shaft 27 which is located in a plane at right angles to the shafts 13, 14 and 15. It will be understood that, as the driving member 25 is moved radially over the face of the disk 26, the velocity of rotation of the latter will be correspondingly varied.

In order to regulate the initial degree of friction between the two members 25 and 26 of the friction drive, as well as to take up any wear of same, the shaft 27 may be mounted for axial movement to a slight degree in its bearings 28, as thru an adjustable screw 29, the adjusted position being fixed by a suitable lock nut 30 and the extent of the outward movement being limited by a collar 31 on the shaft.

The shaft 27, furthermore, substantially at its end, carries a worm 32 engaging a worm wheel 33 on the driving shaft 11; and the drive is in such a direction that the transmission of power from the shaft 27 to the driving shaft 11 will produce an axial thrust by the gearing in the direction of the friction disk members to insure the transmission of power therethru and proportionally to the power transmitted.

There is further provided on the shaft 27 a worm 35, in engagement with a worm wheel 36 of the threaded compensating shaft 15 so that, when the shaft 27 is rotating, the movement of nut 16' on the shaft 15, due to the corresponding rotation imparted to the said shaft 15, will be compensated for. The said nut is caused thereby to reciprocate on said shaft 15 in direct relation to the rotational velocities of the said shafts 13 and 27, and accordingly controls the transmitted rotational velocity by the corresponding radial movement of member 25 with respect to the member 26. The driving shaft 11 is thereby also maintained at a speed which is in accordance with and directly proportional to the rotation of the said control shaft.

We claim:—

1. In apparatus of the character set forth: a control motor and a shaft rotatable thereby, a driving motor and power shaft driven thereby, a driven shaft normally out of engagement with the power shaft, means to transmit power from the said power shaft to the said driven shaft, and means controlling the said power transmission means operated by the said control shaft and the said driven shaft.

2. In apparatus of the character set forth: a control motor and a control shaft rotatable thereby, a driving motor and power shaft thereby, a driven shaft disconnected driven thereby, a driven shaft, a friction normally from said power shaft and a friction drive member on the power shaft and a friction drive disk on the driven shaft whereby power may be transmitted from the former to the latter, and means operating in connection with the said control shaft, the said power shaft and the said driven shaft to effect engagement of the friction members for regulating the rotation of the driven shaft in accordance with the rotation of the control shaft.

3. In apparatus of the character set forth: a control motor and control shaft rotatable thereby, a driving motor and power shaft driven thereby and located parallel to the control shaft, a driven shaft located at right angles to the said shafts and disconnected normally from said power shaft, a friction drive member on the power shaft and a friction drive disk on the driven shaft whereby power may be transmitted from the former to the latter, and means operating in connection with the said control shaft, the said power shaft and the said driven shaft to effect engagement of the friction members for regulating the rotation of the driven shaft in accordance with the rotation of the control shaft.

4. In apparatus of the character set forth: a control motor and control shaft rotatable thereby, a threaded compensating shaft, connecting means including a nut working on said compensating shaft, a driving motor and a power shaft driven thereby, a friction member slidable thereon, a ring mounted on said power shaft to move the friction member, a lever having a yoke at each end, the yoke of one end being pivotally connected with the nut on the said compensating shaft and the yoke at the other end being pivotally connected with the ring mounted on the power shaft, a driven shaft, a friction disk thereon adapted to engage with the friction member of the power shaft, and a worm on said driven shaft and a worm gear in engagement therewith and mounted on the compensating shaft.

5. In apparatus of the character set forth: a control motor and control shaft rotatable thereby, a threaded compensating shaft, connecting means including a nut working on said compensating shaft, a driving motor and a power shaft driven thereby, a friction member slidable thereon, a ring mounted on said power shaft to move the friction member, a lever having a yoke at each end, the yoke of one end being pivotally connected with the nut on the said compensating shaft and the yoke at the other end being pivotally connected with the ring mounted on the power shaft, a driven shaft, a friction disk thereon adapted to engage with the friction member of the power shaft, a worm on said driven shaft and a worm gear in engagement therewith and mounted on the compensating shaft, and means to effect an axial thrust in the direction of the friction member of the power shaft.

6. In apparatus of the character set forth: a control motor and control shaft rotatable thereby, a threaded compensating shaft, connecting means including a nut working on said compensating shaft, a driving motor and a power shaft driven thereby, a friction member slidable thereon, a ring mounted on said power shaft to move the friction member, a lever having a yoke at each end, the yoke of one end being pivotally connected with the nut on the said compensating shaft and the yoke at the other end being pivotally connected with the ring mounted on the power shaft to effect movement of its said friction member along the power shaft, a driven shaft, a friction disk thereon adapted to engage with the friction member of the power shaft, a worm on said driven shaft and a worm gear in engagement therewith and mounted on the compensating shaft, a second worm on said driven shaft, and an operating shaft having a worm wheel in engagement with the said second worm, the engagement of said second worm and its worm wheel being such as to effect an axial thrust in the direction of the friction member of the power shaft.

7. In apparatus of the character set forth: a control motor and control shaft rotatable thereby, a driving motor and power shaft driven thereby, a driven shaft disconnected normally from said power shaft, a friction drive member on the power shaft, and a friction drive disk on the driven shaft whereby power may be transmitted from the former to the latter, means operated by the said control shaft and the said power shaft and the said driven shaft to effect engagement of the friction members for regulating the rotation of the driving shaft in accordance with the rotation of the control shaft, and means to axially adjust the driven shaft to automatically regulate the degree of friction between the said friction members in proportion to the power transmitted from the power shaft to the driven shaft.

Signed at Waterbury, in the county of New Haven and State of Connecticut this 30th day of October A. D., 1922.

MANFRED J. JOHNSON.
THOMAS E. WHITE.